Jan. 28, 1930.　　　E. R. SNOOK　　　1,744,991
SHOCK ABSORBER
Filed June 18, 1921
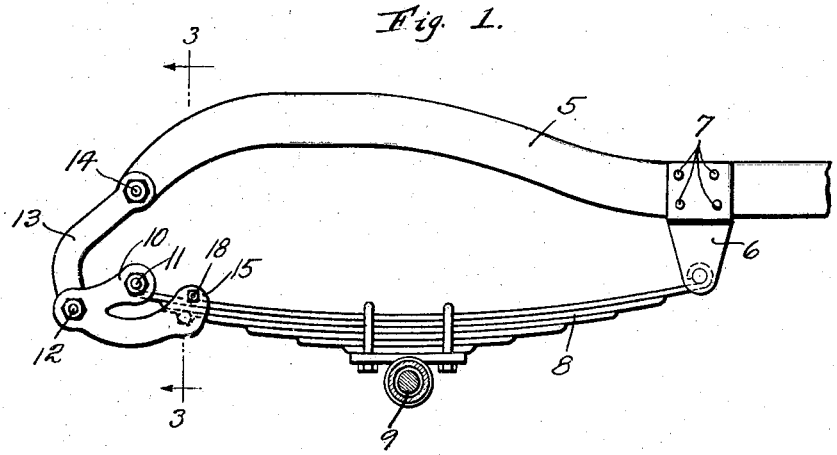
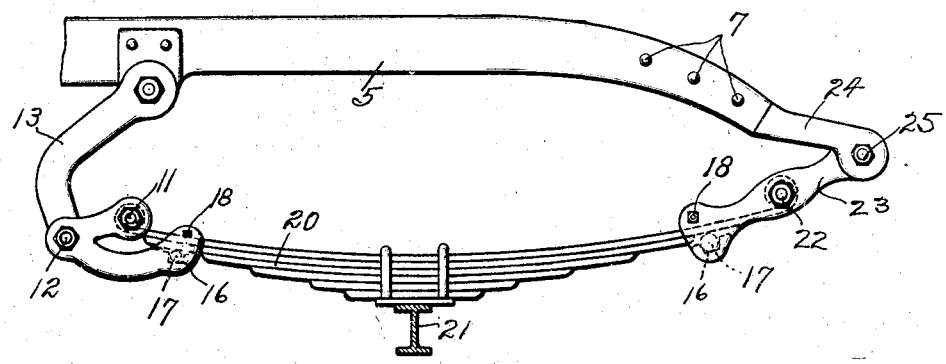
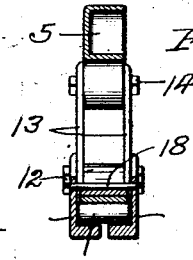
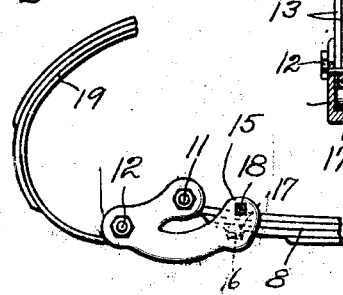
Inventor:
Earnest R. Snook,
By Nissen & Crane
　　　Attys Patented Jan. 28, 1930

1,744,991

UNITED STATES PATENT OFFICE

EARNEST R. SNOOK, OF DAVENPORT, IOWA

SHOCK ABSORBER

Application filed June 18, 1921. Serial No. 478,557.

My invention relates to shock absorbers particularly adaptable for vehicles and has for one of its objects the provision of a simple and efficient device of this character.

A further object is the provision of a simple device of the character mentioned which can be quickly and easily applied to vehicles already in use.

Other objects will appear hereinafter.

An embodiment of my invention is illustrated in the accompanying drawing, forming a part of this specification, and in which—

Fig. 1 is a side view of a rear semi-elliptical spring equipped with a shock absorber embodying my invention;

Fig. 2 is a similar view showing my improved shock absorber attached to a front spring;

Fig. 3 is a section taken on line 3—3 of Fig. 1; and

Fig. 4 is a fragmental view of two portions of a three-quarter elliptical spring showing the application of my shock absorber thereto.

Referring more particularly to the drawing, I have indicated a frame part 5 of a vehicle, and in Fig. 1 the rear end of said frame is shown particularly. In the construction illustrated therein a bracket 6 is attached to the frame part 5 in any desirable manner, such as by the rivets 7. To the lower end of the bracket 6 is pivoted the front end of the semi-elliptical rear spring 8. The central portion of the latter is attached to an axle 9 in the usual or in any desirable manner.

At the rear end of the spring 8 I have pivoted an end 10 of an angular lever on a bolt 11, or its equivalent. The angular portion of the angular lever is pivoted as at 12 to the lower end of a link 13, and the latter pivoted as at 14 to the frame 5.

The other end 15 of the angular lever is provided with a trough 16 in which is loosely mounted a cylindrical roller 17 and the latter bears against the lower side of spring 8.

In practice a strong construction is provided by making the angular levers in pairs with one at each side of the end of spring 8, as clearly indicated in Fig. 3. Between the ends 15 of the two angular levers I provide a bolt 18 which holds the ends 15 of said angular levers against spreading and also prevents the ends 15 from moving downwardly away from the spring 8 and thereby maintains the roller 17 within its trough 16. In Fig. 4 I have indicated the angular lever having the connection with spring 8 as above indicated, but instead of having link 13, I have provided the end portion of what may be a three-quarter or full elliptical spring 19 which is connected directly to the bolt 12 passing through the angular portions of the pair of angular levers. It will be apparent therefore that my improved shock absorber is adapted for either semi-elliptical, three-quarter elliptical, or full elliptical rear springs.

In Fig. 2 I have indicated my improved shock absorber as applied to the rear end of a front spring 20 of a vehicle. Said spring 20 may be attached to the front axle 21 in any desirable manner. In this construction the rear end of spring 20 is pivoted on a bolt 11, as in Fig. 1, to the angular lever. The angular portion of the angular lever is pivoted to a link 13 on the bolt 12, as in Fig. 1. This construction is also provided with the trough 16, roller 17 and bolt 18, as explained in connection with the rear spring construction.

In Fig. 2 I have indicated the front end of the spring as being pivoted on a bolt 22 which passes between a pair of straight levers 23. The rear end of the straight levers are provided with the troughs 16 in which is mounted a roller 17 and also provided with a bolt 18, all similar to corresponding parts of the shock absorber for the rear end of said spring. When using the lever 23 the front end of the frame 5 is preferably provided with an arm 24 which has its front end pivoted as at 25 to lever 23 and its rear end rigidly secured to frame 5 as by rivets 7. It will be apparent also that the lever 23 and arm 24 may be dispensed with and the front end of the spring connected to the front end of the frame as in usual construction or as suggested in the connection of the front end of spring 8 with the frame.

The mode of operation of the spring stabilizer embodied in my invention will be clearly seen by considering the action it has upon a spring, such as shown in Fig. 2, under the various forces to which such a spring is subjected.

When the wheels of a vehicle, having such a spring and stabilizing device attached thereto, run into a hole the body of the vehicle tends to follow and to thrust its entire weight downwardly with a terrific force. This impact tends to bend the ends of the spring downwardly and at the same time the angular lever is moved slightly about its pivotal bearing on the end of the spring by the link which is connected to the frame of the vehicle. This movement of the angular stabilizing device causes the end of the long arm thereof to bear upwardly on the under side of the spring at a point between the middle thereof and the end portion. This upward thrust of the lever arm is increased as the weight and momentum of the vehicle tend to bend the spring downwardly and to rotate the angular stabilizing device.

The roller which is inclosed in a socket or trough on the end of the long arm of the lever bears against the lower surface of one of the leaves of the spring and presses all of the leaves thereabove tightly together. This pressure results in an increased amount of friction between the leaves and thus prevents free and easy sliding of one leaf relative to the others and produces a substantially rigid spring. It should be understood that the friction is developed by virtue of the downward movement of the body frame and the link to which the stabilizing device is attached and that such friction increases in proportion to the flexure of the spring and with the amplitude of the downward thrust of the vehicle frame. In other words the resistance of the spring is built up by means of this sliding friction, in proportion to the force or thrust it receives.

Extreme downward movement is also prevented by the upward thrust of the long arm of the lever. This extended lever arm produces an upwardly directed supporting force on the under side of the spring that also increases in magnitude in proportion to the degree of impact received by the spring. The point of application of this upwardly directed force is located between the middle of the spring and the ends thereof and thus a double curvature is given to the spring which also increases its rigidity. It should be understood that all of the stabilizing forces are applied on the spring at such times when the spring tends to bend downwardly by excessive thrust or impact being applied on the ends thereof, and that such resisting forces are developed in magnitude proportional to the magnitude of the thrust or impact applied. Thus the spring is not intensely rigid at all times, but is flexible to resist slight shock and vibration and is automatically rendered rigid to resist excessive shock such as that caused when the wheels of a vehicle run into a hole and the body of the vehicle tends to follow with a terrific momentum.

When the downward thrust of the body of the vehicle has been overpowered, it is the tendency of the springs to dissipate the energy stored therein by projecting the frame together with the body upwardly. The extent to which the body rebounds being dependent upon the degree of distortion suffered by the spring during the downward movement of the frame and body. Thus, as explained, a vehicle spring equipped with the described stabilizing device is not permitted a large freedom of downward movement and as a result the recoil is small in proportion. In other words the stabilizing device is capable of reducing the recoil by means of reducing the cause thereof.

The longer arm of the stabilizing lever does not discontinue its application of force on the under side of the spring instantly, but rather gradually decreases the magnitude of the force during the entire rebound movement. This provides a gentle and gradual cushioning action and prevents sudden and disagreeable changes in the direction of movement of the body.

I claim:—

1. The combination with a vehicle frame and leaf spring therefor, of a lever pivoted at one end to said spring and having its other end adjacent the lower surface of an intermediate part of said spring; a roller between the last-mentioned end of the lever and said spring and a link pivotally connected to an intermediate part of said lever and to said frame in a position to cause said roller to press upwardly on said spring to prevent excessive downward movement thereof.

2. The combination with a vehicle frame and leaf spring therefor, of an angular lever having one end bearing upwardly against the under side of the spring for restraining excessive downward movement thereof and its other end pivoted to an end of the spring; and a link connected between said frame and the angular part of said lever intermediate the ends of the latter.

3. The combination with a vehicle frame and spring therefor, of two substantially V-shaped levers side by side with one pair of their ends connected with said spring and the other pair of their ends engaging the under side of an intermediate part of said spring; and a free end unobstructed link connection between said frame and the angular portions of said levers intermediate the ends of each of the latter.

4. The combination with a vehicle frame and spring, of two substantially V-shaped levers side by side with registering troughs in one pair of ends of said levers, the other pair of said ends of said levers connected to an end of said spring; a roller in said troughs engaging said spring; and free and unobstructed means connecting the angular parts of said levers with said frame.

5. The combination with a vehicle frame and spring therefor, of an extension at one end of said frame; a lever having one end pivoted to said extension and an intermediate portion pivoted to said spring, the other end of said lever having an engagement with said spring intermediate the ends thereof for applying an upwardly directed force upon a rigid portion thereof during the downward movement of said spring; an angular lever having one end pivoted to the other end of said spring, the other end of said angular lever having a trough therein, a roller in said trough engaging the under side of said spring; and a link connecting the angular portion of said angular lever with said frame.

6. The combination with a vehicle frame, of an elongated spring for supporting said frame, means for pivotally attaching said spring to said frame adjacent on end of said spring, means for attaching said spring to said frame adjacent the opposite end of said spring, said last-named means comprising a bifurcated lever having one arm thereof longer than the other, the end of the shorter arm being pivotally connected to the end of said spring while the end of the longer arm slidably engages the lower face of said spring and pressing upwardly thereon to resist downward movement thereof, and a link having its upper end pivotally connected to said frame and having its lower end pivotally connected to said lever adjacent the juncture of said arms.

7. The combination with the frame of a vehicle, of an axle for supporting said frame, a spring supported by said axle intermediate the ends thereof, said spring having its ends bent upwardly above the support on said axle, a lever having one end pivotally connected to said frame and having a recess in the upper face thereof for receiving a portion of said spring adjacent one end thereof, said spring being pivotally connected to said lever intermediate the ends thereof, a second lever connected with the opposite end of said spring, said last-named lever comprising a bifurcated member having one arm longer than the other, the shorter of said arms being pivotally connected to the end of said spring while the longer arm having a recess therein for receiving said spring engages the lower face of said spring at a point thereon between the end of said spring and said axle, the juncture of said arms being positioned beyond the end of said spring, and a link pivotally connected to said lever adjacent the juncture of said arms, the upper end of said link being pivotally connected to said frame.

8. The combination with a vehicle frame and leaf spring therefor, of an angular lever having one end at the under side of said spring and its other end pivoted to an end of said spring, and a link connection between said frame and the angle part of said lever intermediate the ends of the latter and in position to cause said end to bear upwardly on said spring to press the leaves thereof together and thereby cause increasing sliding friction therebetween during downward flexure of the spring.

In testimony whereof I have signed my name to this specification on this 13th day of June, A. D. 1921.

EARNEST R. SNOOK.